United States Patent
Shah et al.

[11] Patent Number: 5,339,398
[45] Date of Patent: Aug. 16, 1994

[54] MEMORY ARCHITECTURE AND METHOD OF DATA ORGANIZATION OPTIMIZED FOR HASHING

[75] Inventors: Imran A. Shah, North White Plains, N.Y.; Brian C. Johnson, Stamford, Conn.

[73] Assignee: North American Philips Corporation, New York, N.Y.

[21] Appl. No.: 913,764

[22] Filed: Jul. 14, 1992

Related U.S. Application Data

[63] Continuation of Ser. No. 750,220, Aug. 19, 1991, abandoned, which is a continuation of Ser. No. 388,279, Jul. 31, 1989, abandoned.

[51] Int. Cl.⁵ .............................................. G06F 12/02
[52] U.S. Cl. .................................... 395/400; 395/425; 364/DIG. 2; 364/955; 364/958
[58] Field of Search ................ 364/DIG. 1, DIG. 2; 395/375, 400, 425, 550, 600, 725

[56] References Cited

U.S. PATENT DOCUMENTS

| | | | |
|---|---|---|---|
| 4,215,402 | 7/1980 | Mitchell et al. | 364/200 |
| 4,290,105 | 9/1981 | Cichelli et al. | 364/200 |
| 4,611,272 | 9/1986 | Lomet | 364/200 |
| 4,730,249 | 3/1988 | O'Quin, II et al. | 395/700 |
| 4,736,287 | 4/1988 | Druke et al. | 364/200 |
| 4,807,122 | 2/1989 | Baba | 364/200 |
| 4,897,785 | 1/1990 | Züger | 364/200 |
| 4,916,658 | 4/1990 | Lee et al. | 364/900 |

OTHER PUBLICATIONS

Horowitz et al., Fund. of Data Structuers in Pascal 1987, pp. 452-467.
Ralston et al., "Encyclopedia of Computer Science", 1976 p. 267.
I.E.E.E. Software 5 (1988) Jul., No. 4, New York, N.Y. USA "Multikey, Exensible Hashing for Relational Databases", pp. 77-85.

*Primary Examiner*—Paul V. Kulik
*Assistant Examiner*—John C. Loomis
*Attorney, Agent, or Firm*—David R. Treacy

[57] ABSTRACT

A hashing data storage and retrieval arrangement whose storage capacity is unaffected by collisions. A first memory serves as a hash index table, for storing pointers at each address location corresponding to a hash value generated by hashing a key data word. Each pointer is the address of a location in a second memory, which has a separate storage location for each key data word, its associated data, and a further pointer which is the address of the next key data word resulting from a collision during hashing. Preferably a pipeline register between the two memories permits hashing of a subsequent key data word while accessing of the second memory is still in progress.

8 Claims, 10 Drawing Sheets

FIG. II

MEMORY ARCHITECTURE AND METHOD OF DATA ORGANIZATION OPTIMIZED FOR HASHING

This is a continuation of application Ser. No. 07/750,220 filed Aug. 19, 1991 now abandoned which is a continuation of 07/388,279 filed Jul. 31, 1989, now abandoned.

CROSS-REFERENCE TO RELATED APPLICATIONS

The preferred embodiment disclosed herein embodies inventions claimed in four other concurrently filed commonly-owned applications, by one or both of applicants herein, namely Ser. Nos. 338,263; 388,281; 388,282; and 388,283.

BACKGROUND OF THE INVENTION

The present invention relates to a memory architecture optimized for hashing, and to a method of organizing data which is optimized for hashing, and more particularly optimized for carrying out the Lempel-Ziv data compression algorithm.

The problem of organizing and storing data in a manner to allow quick retrieval is constantly encountered. A large variety of techniques known as hashing have been used to solve tile data organization and retrieval problem.

Frequently, a data element will have a value range that makes retrieval by searching by simple look-up impracticable. For example, a small five character ASCII word can have over a trillion possible values, and would require an equally large space of memory addresses if every possible value were allocated a unique address in the memory address space.

Hashing involves the application of a many-to-one function to the data element to map it from a larger to a smaller address space. The smaller address space will be the space of memory addresses in which the data is to be stored. A data element, called a key, is used as the argument of the many-to-one function, called the hash function. Storage of information associated with the key is accomplished by computing the hash function and storing the key, and associated data, in a memory at an address, called the hash address, corresponding to the hash function value. Because of the many-to-one property of the hash function, a smaller address space is required than if each of the possible data elements were to be assigned a unique address in memory. Retrieval of stored data associated with a particular key then involves simply computing the hash function value for the key and reading out the stored data from the memory.

Because of the many-to-one mapping by the hash function, more than one key can be hashed to the same memory address. This condition is called a collision, and a large number of techniques have been developed for resolving collisions. Good summaries of hashing techniques including collision resolution can be found in D. E. Knuth, The Art of Computer Programming, Vol. 3: Sorting and Searching (1973) and J. S. Vitter, Analysis of Coalesced Hashing, Stanford University Department of Computer Science, Report No. STAN-CS-80-817, August 1980, reprinted in part at J. S. Vitter, "Tuning the Coalesced Hashing Method to Obtain Optimum Performance", Proceedings of Twenty-first Annual Symposium on Foundations of Computer Science, October 1980.

Many of the collision resolution methods utilize a technique called chaining. In the chaining method a dynamic linked list is maintained at each memory address corresponding to a hash function value or hash address. The hash addresses are stored in a table. The key and associated data is organized as a record which includes a key field, fields for data associated with the key, and a link field. After hashing a key, if there is a collision a sequential search is performed in the list to locate the particular record containing the key value being searched. If the list terminates without the key being found, and if it is desired to add the key and any associated data to the stored data, a new list element is added in the form of a record with that key as its content.

The chaining method has two principal advantages and two drawbacks. Because on the average the linked lists associated with each of the hash addresses are small, the search time for data retrieval is short. This remains true even as the hash address table begins to fill up. Knuth (cited above) has shown that even width the table completely full the chaining method requires only about 1.5 to 1.8 probes in order to locate the key. In addition, the hash address of the key is uniquely associated with it, that is, a key always hashes to the same hash value even though other keys may hash to that same value, and does not depend on the order in which the key is inserted in the hash address table. This uniqueness allows the use of abbreviated keys and a resultant reduction in storage requirements and in search time.

One possible problem with the chaining method is that the overhead of the link field could create severe memory requirements. A second problem is that an additional block of memory, used as overflow memory, is required in order to ensure adequate storage of the linked lists associated with each of the hash addresses. These two problems are intertwined.

If, because of the nature of the data, or because of Foot hash function properties, many keys are hashed to the same hash address, the overflow memory will have to be big enough to store a substantial part of the entire key space. Even for well behaved hash functions, Vitter (cited above) has shown that the overflow memory can increase the overall memory requirements from about 37% to 100%.

Hashing efficiency can be increased by expanding the memory available for hash addresses. The larger the hash table that can be used for a given number of entries, the less the likelihood of a collision. However, because each hash address requires an associated link field, increasing the memory available to the hash table will expand the memory requirements by more than just the additional memory allocated to the hash table.

It is accordingly an object of the invention to provide a memory architecture and a method of data organization optimized for hashing which permits collision resolution by chaining and which also minimizes the amount of memory which must be allocated.

SUMMARY OF THE INVENTION

According to the invention, the memory architecture optimized for hashing comprises two blocks of memory. The first block of memory is used only for storing link fields or pointers to the second block of memory. Each address in the first block of memory corresponds to a hash table address, and the pointer values stored in the first block of memory point to key values and associated data such as abbreviated keys or key portions, tag values, and/or further pointers, in the second memory block.

The disclosed architecture has several advantages. It inherently decouples the load factor of the hash table and the memory requirements for the keys and associated data. Secondly, the memory requirements of the second memory block can be met independent of the first memory block capacity. Moreover, no excessive memory requirements are created because of a poorly behaved hash function.

Each hash address in the first memory block stores only a single pointer. The capacity of the first memory block, and hence the hash table, can be expanded with minimum penalty because it does not contain the key or associated data. The second memory block need be only large enough to store key data, which by themselves or in conjunction with the address value are sufficient unambiguously to define the value which was hashed and is stored there, and other associated data. Even in the extreme case of a hash function hashing every key to the same hash address, the second block of memory need be no larger than that required by the data to be stored.

Another feature of the invention is that it can be readily implemented with a pipeline architecture which eliminates any penalty in system throughput arising from two successive access of the hash memory and the memory for the associated key and other data. This is achieved by the use of a register or other store between the first and second memories. This architecture allows a key to be hashed to an address in the first memory block and the stored pointer value to be read out and stored in the pipeline register. The pointer value in the register is subsequently used to read out the associated key data from the second memory block. During the time interval that the second memory block is being accessed, a subsequent key can be hashed to the first memory block, and consequently the hashing of the subsequent key is substantially eliminated from the total search time. As a result, throughput is as high as if only a single access were required.

DESCRIPTION OF THE PREFERRED EMBODIMENT

Figure 1:
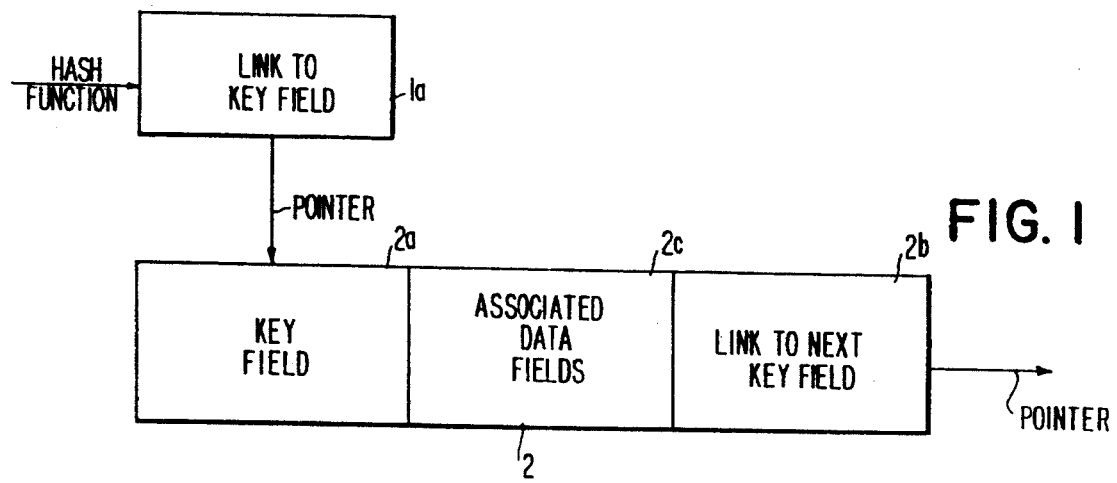
FIG. 1 illustrates tile data organization used in the present invention.

The data organization or data structure used is illustrated in FIG. 1. A link field $1a$ is stored in memory independently of other data $2c$ at an address corresponding to a hash function value. Multiple link fields are stored in memory in a table at addresses corresponding to hash table values, and the value stored in the link field $2b$ at a hash table address is a pointer to the memory location of address of a corresponding key $2a$ and any other associated data fields $2c$. Each key $2a$ is contained in a record 2 which also has an associated link field $2b$ for storing a pointer to a record of a successive key corresponding to the same hash address.

Figure 2:
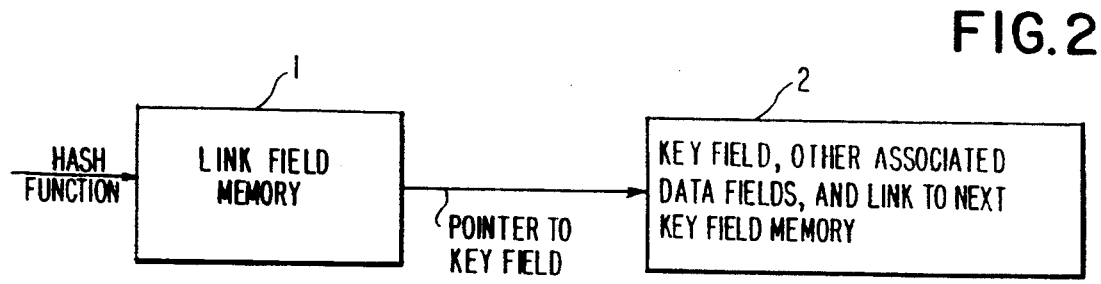
FIG. 2 illustrates the memory architecture according to the invention.

The corresponding memory architecture is shown in FIG. 2 and comprises a first memory 1 and a second memory 2. The first memory 1 stores only the link field values at the addresses comprising the hash table. Each address of the memory 1 is a hash table address and is addressed by a hash function value applied to the memory 1. In accordance with the invention, the capacity of memory 1 is chosen to optimize hashing according to a desired criteria. The load factor of the memory 1 used to store the hash table can be predetermined, and the capacity of memory 1 selected to achieve that load factor.

It is evident that the capacity of memory 1 and its load factor can be selected solely according to the size of the hash table, if desired. There is no need to consider the number of key fields or other data fields that will be stored, in order to select the capacity of memory 1. Memory 2 is used to store the key and other data fields.

Data stored in memory 2 can be inserted successively, and the address values at which the keys and other data are stored are the pointer values in the memory 1. The capacity of memory 2 is selected to be sufficient to meet the storage requirements for the keys and other data. The link fields in memory 2 permits chaining to be used for collision resolution. The first key corresponding to a particular hash address that is inserted in the memory 2 has an address in memory 2 corresponding to the pointer stored in memory 1 at the hash address. The second key corresponding to the same hash address is stored in memory 2 at an address of memory 2 which is stored in the link field of the record containing the first key. In this way, a linked list is created within memory 2 that is accessed through the pointer value stored in memory 1. The keys and other data successively stored in memory 2 can be stored in contiguous memory in the form of linked lists to maximize utilization of memory 2. The capacity of memory 2 need only be sufficient to meet the storage requirements of the data. Thus, the capacity of each memory can be independently optimized for hashing.

A consequence of the decoupling of the hash addresses and the associated key and other associated data fields is that a minimum of two memory accesses is required in order retrieve a key. This doubling of retrieval time for a single key might be acceptable if retrieval of stored data is infrequent. However, if the stored data must be accessed repeatedly it would be desirable to effectively eliminate, or at least greatly reduce, the increased access time of the memory architecture just described.

Figure 3:
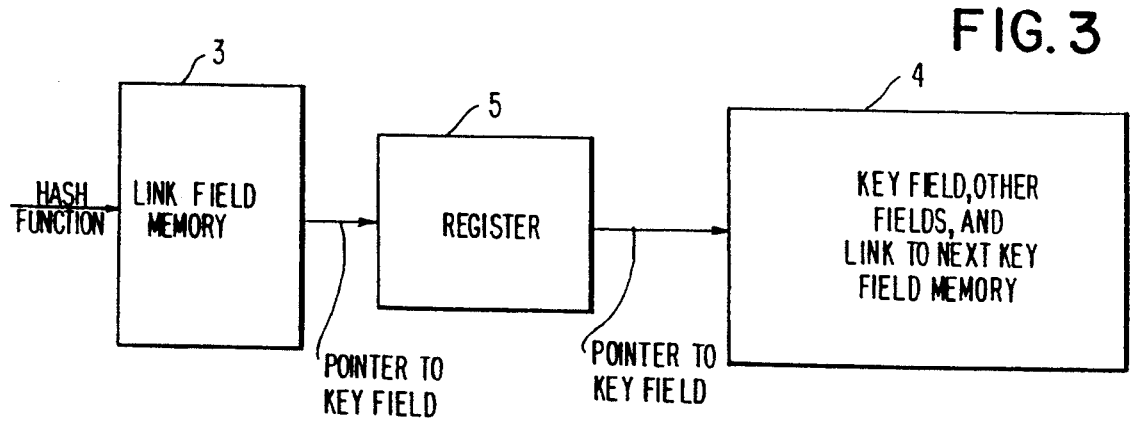
FIG. 3 illustrates another memory architecture according to the invention.

FIG. 3 illustrates another memory embodiment comprised of a first memory 3 for storing the link fields comprising the hash table. A second memory 4 stores key and other associated data fields, and link fields associated with each key, in the manner already described. Thus, both embodiments use the same method of data organization. This second embodiment further comprises a register 5 for storing the pointer values read out from the first memory 3, and for using the pointer values stored therein to access the second memory 4. The storage of the pointer value read out from the first memory 3 within the register 5 permits a second key to be hashed to the first memory 3 while the second memory 4 is being accessed.

For example, suppose a key $k_i$ is hashed to a particular address in the first memory 3 and a pointer stored at that address is read out. At the next read operation a subsequent key $k_{i+1}$ will be hashed to another address of the memory 3, while the pointer value in the register 5 will address the memory 4 to read out the data associated with $k_i$. The system can perform a validity test of the data stored in memory 4, that is, look for a match of key $k_i$ with the content of memory 4, while the key $k_{i+1}$ is being hashed to the first memory 3. If a match with key $k_i$ is attained the pointer associated with key $k_{i+1}$ can be applied to the second memory 4; otherwise, nothing is done with the pointer corresponding to key $k_{i+1}$ until key $k_i$ is resolved as either a success or failure. In either event, the access of the first memory 3 by the hashed value of key $k_{i+1}$ will have already occurred and will not contribute to the total search time.

Figure 4:
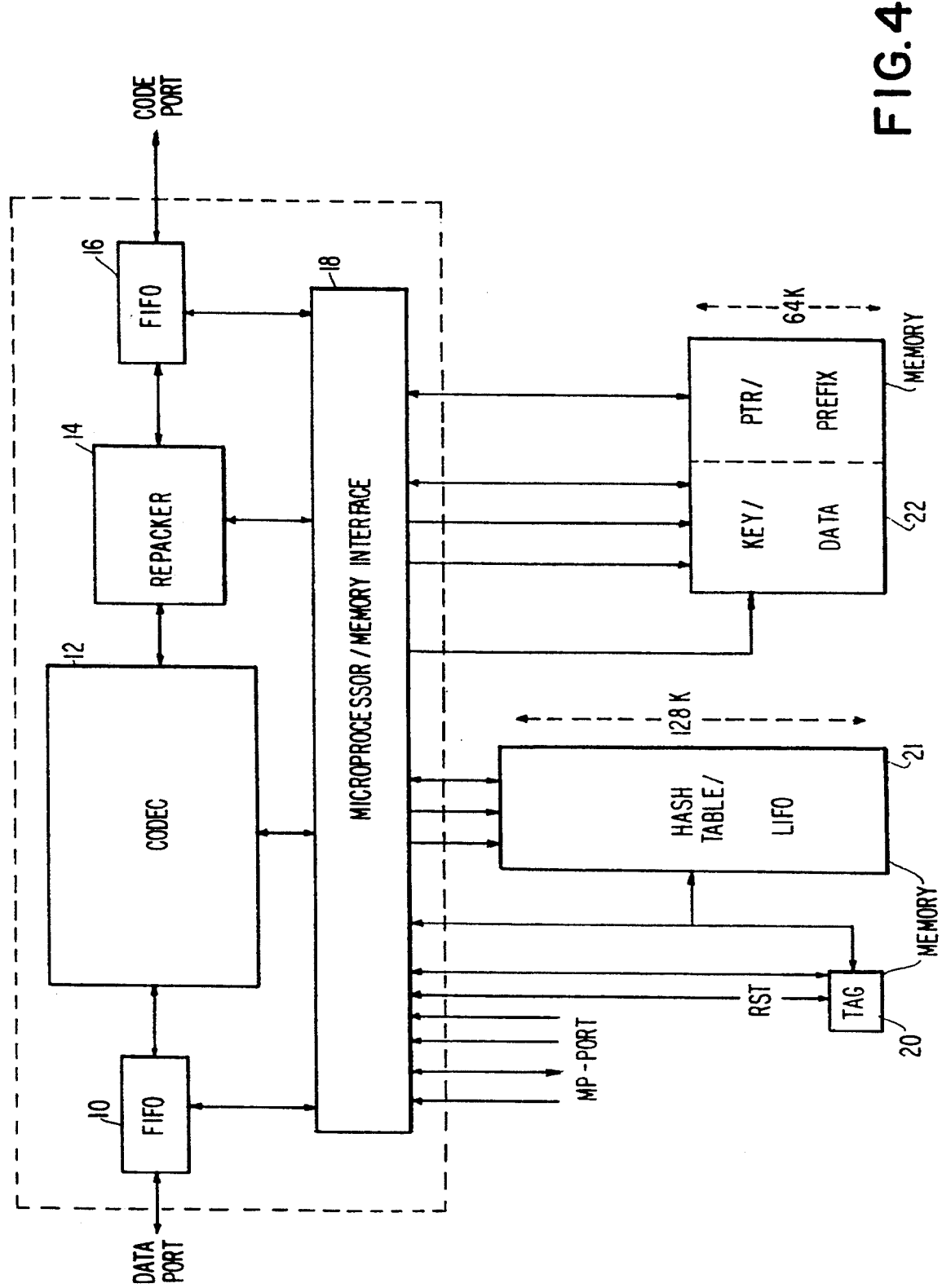
FIG. 4 illustrates a data compressor-decompressor having the memory architecture shown in FIG. 3.
Figure 4A:
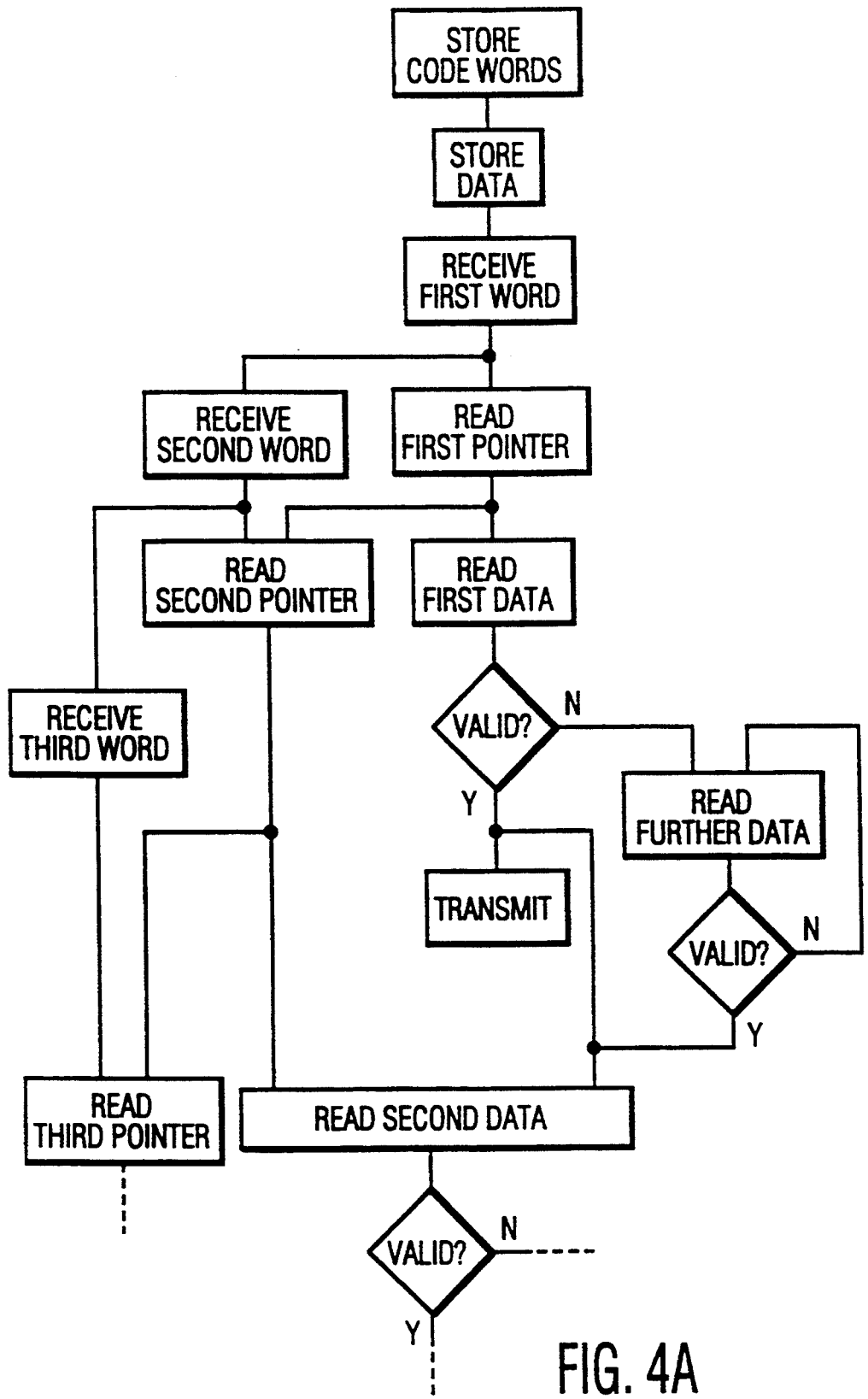
FIG. 4A is a flow chart illustrating the operation of the data compressor-decompressor of FIG. 4.

One application for the disclosed data structure and memory architecture is in the area of data compression. FIG. 4 illustrates the structure of a dedicated integrated circuit for carrying out data compression according to the Lempel-Ziv algorithm, in which hashing is carried out by hardware circuits. The data which is hashed is organized and stored in a memory as just described.

A good introductory explanation of the Lempel-Ziv (LZ) algorithm can be found in the article by Terry A. Welch, "A Technique for High-Performance Data Compression", Computer, June 1984, pp. 8-19. The treatment of the algorithm given in the Welch article is summarized below.

The LZ algorithm maps strings of input characters into fixed-length codes. The string-code word pairs are stored in a table called the string table. Table entries are generated during data compression. More particularly, a message comprised of a sequence of characters is parsed character-serially in one pass, and the longest recognized input string S is parsed off each time. A recognized string is one that already exists in the string table. The code word for the recognized string S is transmitted, and the recognized string S with the next character C of the message appended, SC, is added to the string table and assigned a unique code word.

The LZ algorithm can be more explicitly described as follows:

```
Initialize string table to contain single-character
   strings of message characters
Read first input character → prefix string S
STEP: Read next input character C
   If no such C (input exhausted): code S →
      output; EXIT
   If SC exists in string table: SC → S;
      repeat STEP
   Else SC not in string table: code (S) →
      output
```

```
      SC → string table
      C → S; repeat STEP
```

Starting with an initialized string table containing the character set from which the message will be composed, the first message character is read and set to the prefix string S. If there is a subsequent message character it is read and appended to the prefix string to form the new string SC. The string table is then checked to determine whether the string SC is already entered. If there already is an entry for SC, then the string SC is set to the prefix string S, the next message character C is read, and the step is repeated. Otherwise, if the string SC is not in the table, the output code word for the prefix string S is transmitted, a new table entry for the string SC is created, the character C is set to the prefix string S, and the step is repeated.

The data compressor/decompressor is comprised of a first-in first-out buffer memory (FIFO) 10 having an input which constitutes a data port which receives the sequence of message characters to be compressed. The FIFO 10 is not an essential element of the system but is used to smooth the data rate which could otherwise vary because of the variable search times that can occur during execution of the LZ algorithm.

A coder/decoder (CODEC) 12 receives the output from the FIFO 10 and encodes the applied signal according to the LZ algorithm by operating in the encoding mode. The encoded signals from the CODEC 12 are applied to repacker 14 which accepts input data streams of variable width and which generates output data streams of variable width, The repacker 14 output is applied to the FIFO 16 which is effective to smooth the rate of the code signals sent from the code port of the data compressor/decompressor.

The FIFO's 10 and 16, the CODEC 12, and the repacker 14 are initialized and put in operation by the microprocessor/memory interface 18. The interface 18 receives control signals from the system in which the data compressor/decompressor is incorporated, and passes signals between the components of the data compressor/decompressor just described and memories used by it. The FIFO's 10 and 16, CODEC 12, repacker 14 and interface 18 are, in the preferred embodiment, fabricated as a single integrated circuit, as shown by the dashed line in FIG. 4. The memories 20, 21 and 22, which are described below, are separate components. Alternatively, some or all of the components of the data compressor/decompressor could be constructed as separate units, or memory could be provided on the integrated circuit comprising the data compressor/decompressor.

The memory architecture requires that the Lempel-Ziv algorithm be executed somewhat differently than the basic LZ algorithm described above. This is because the first memory (21 in FIG. 4) contains only pointer values and thus can not be addressed without a string including a prefix, and the correct value of the string prefix will not be known with certainty without accessing and resolving the search in the second memory (22 in FIG. 4).

In order to use the pipelined memory architecture the LZ algorithm is executed by selecting a prefix. As will be more fully explained below, the selected prefix is either an assumed prefix which is a codeword corresponding to the pointer (address in the second memory)

resulting from the immediately previous hashing, when that second memory address had already contained certain data; or is the immediately preceding character. The selected prefix and the latest received character (data) are concatenated to form a prefixdata combination which is then hashed to provide an address in the first memory 21. The first memory is accessed to determine if a resulting pointer value is already stored there. If a resulting pointer value is stored in the first memory 21, thus indicating that the second memory 22 includes data at this address, a success is assumed.

Accordingly, that resulting pointer value becomes the next assumed prefix, and it and the next received data are hashed to the first memory 21 while the resulting pointer value derived from the previous hashing operation is used to address the second memory 22. If there is a match between the two keys (for example, an abbreviated key stored at that location in the second memory 22 and an abbreviated key obtained from the hashing whose success had been assumed) one cycle of the processing of the next-prefix data will have been achieved. On the other hand, if the key does not match, i.e. there is a failure, the assumption about the prefix was incorrect. In the next cycle the key will be written in the second memory, and also during that cycle the new key with the corrected prefix will be hashed to the first memory. In this way the speed increase attributable to a pipeline architecture can be achieved with the LZ algorithm.

The justification of anticipating the prefix value is a consequence of the fact that the LZ algorithm compresses data such as an image by a factor of two to three, with average string lengths of between four and six data elements. This results in success about three times more frequently than failure when searching for a prefix-data combination. Consequently, one can anticipate a prefix and be correct 75% of the time, even before a prefix can actually be resolved.

In LZ encoding, data strings of varying length are represented by codes. Each successive data word is appended to a prefix, which is a code representing a string of previous data words. A search is then performed in the code-table for this prefix-data combination, representing a longer string. If the prefix-data combination is found in the code table ("a success") the code assigned to this prefix-data combination becomes the new prefix. The next data word will then be appended to this new prefix when the cycle is repeated. If the prefix-data combination is not found in the code table, it is added to the table along with a new code-word representing it. The prefix, representing the longest found data string found in the table, is transmitted.

The CODEC 12 includes circuitry for both encoding input data according to the LZ algorithm, and for decoding LZ-encoded data.

Figure 5:
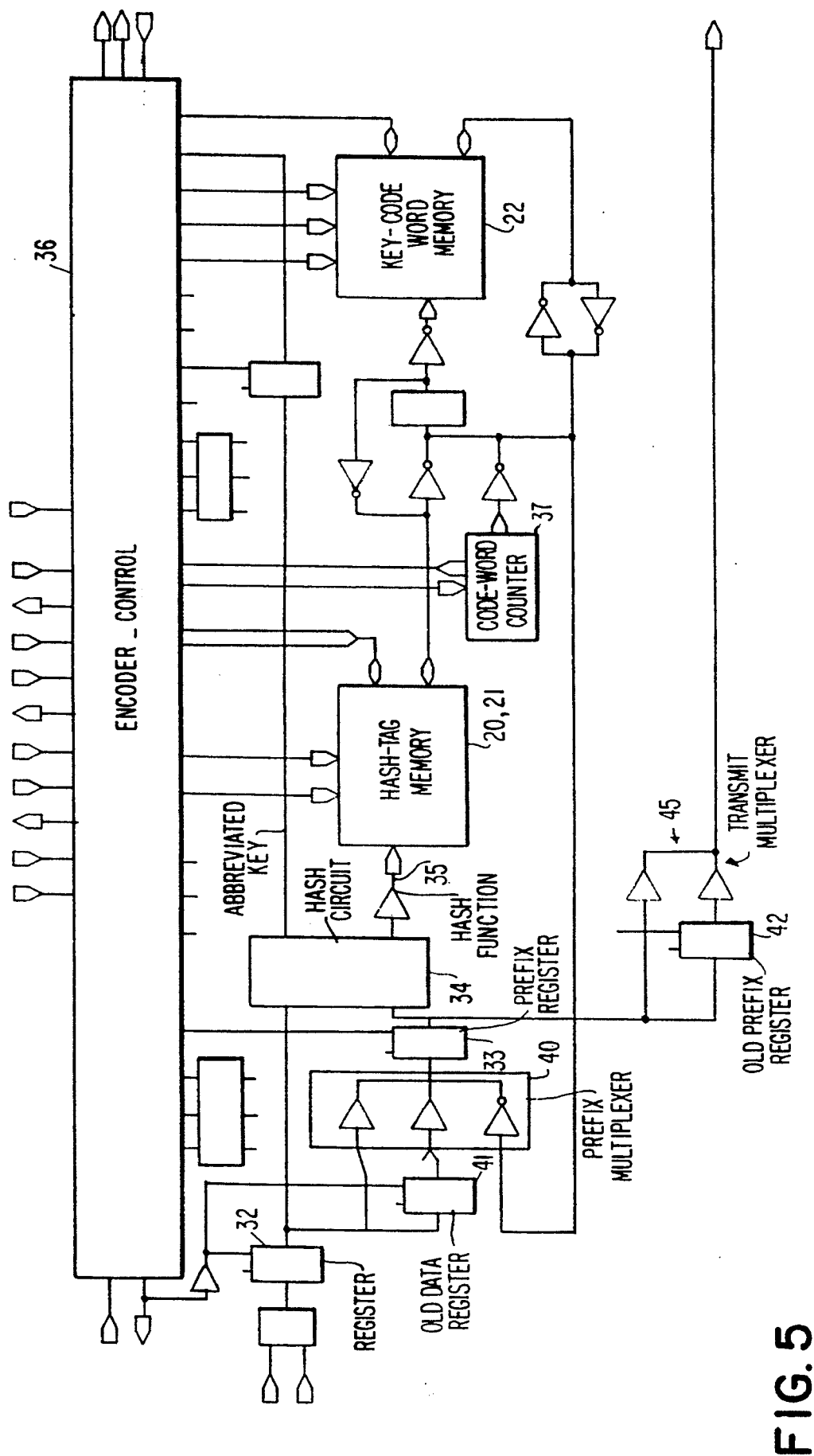
FIG. 5 illustrates a data encoder used in the compressor-decompressor shown in FIG. 4.

The encoder portion of the CODEC 12 is illustrated in FIG. 5. A new data word is received from the FIFO 10 by the data register 32. A prefix register 33 stores a prefix to which the new data word is to be appended. The new data word and the prefix from the register 33 are applied to a hash circuit 34 which develops a hash address and an abbreviated key. The hash circuit 34 is described in detail, below.

The hash address is applied through the signal path 35 to the hash-tag memory 20, 21 to read out the content of the memory 20, 21 at the address corresponding to the hash function. The tag value read out from the hash-tag memory is either 0 or 1 depending upon certain conditions. The memory 21 reads out a pointer to the possible location of the key in the second memory. (Although hash-tag memory 20, 21 is shown in FIG. 5 as part of the encoder, it is physically separate from the encoder as shown in FIG. 4)

A tag bit value of 0 indicates that the prefix-data combination has not been encountered before (a "failure"). In this case a new code word corresponding to the hash address is obtained from the code-word-counter 37 and entered at the memory location of the hash memory 21 through the encoder control 36. The tag bit is re-written as a 1 to indicate a valid entry at the memory location. Finally, the abbreviated key is entered at the code-word location of the key-code-word memory 22. The prefix-multiplexer 40 selects the current data from the register 32 as the next prefix and stores it the prefix-register 33. The current prefix content of the register 33 is transmitted out through the transmit multiplexer 45 to the repacker 14.

A tag bit value 1 indicates a valid entry in the hash memory 21. In this case, the content of the hash memory will be used in the next cycle as an address to read and compare the abbreviated key. At the same time the prefix multiplexer will assume that the abbreviated key will match and will use the contents of the hash memory 21 as the next prefix. If the abbreviated key matches, i.e., a success, the prefix assumption was valid. The operation of the encoder continues using the results of the access to the hash-memory.

If the abbreviated key does not match and the tag bit of the key-code word memory 22 is 0, which indicates an end of list, then the condition is a failure following a collision. The assumption made about the prefix in order to carry out the hash operation was incorrect. The results of the hash operation are then ignored and the old data stored in the old data register 41 is used as the new and correct prefix. At the same time the old prefix stored in the register 42 is transmitted out. The tag bit value of the key/code-word memory is updated to 1, and the code word value is written in the code-word memory 22. In the next cycle, using the code word memory contents as the address, the new abbreviated key is written in the key memory 22 and the tag bit at that location is initialized to 0. In other words, a new link is added to the link list, and the end-of-list pointer is updated.

When the abbreviated key does not match, but the tag bit of the key/code-word memory is 1, the end of the list has not yet been reached. The content of the code-word memory 22 at this address is pointing to the next possible location of the key being sought.

In the next cycle the content of the code-word memory is used as an address and the key is searched for again. This process is continued until either the key is found, a success occurs, the end-of-list is reached, or a failure occurs. Each time an address is found pointing to the next possible location of the key, it is assumed that the key is going to be found there. Because a success is assumed, this address is used as the prefix for hashing and is passed through the prefix multiplexer 40 to the hash circuit 34. The results of a hashing are used only if the key matches, i.e. a success occurs.

Information regarding the data to code word correspondence developed by the encoder during the encoding process is used by the decoder during subsequent decoding. During encoding a transmission is made after every failure, and is accompanied by a new code-table entry. This information is used by the decoder. Each time the decoder receives a code it makes a corresponding entry to its code-table by appending the first character of the currently received code to the previous code and assigning a new code word to it in the code table. At the same time the decoder outputs a string corresponding to the current code, always operating just a step behind the encoder.

Figure 6:
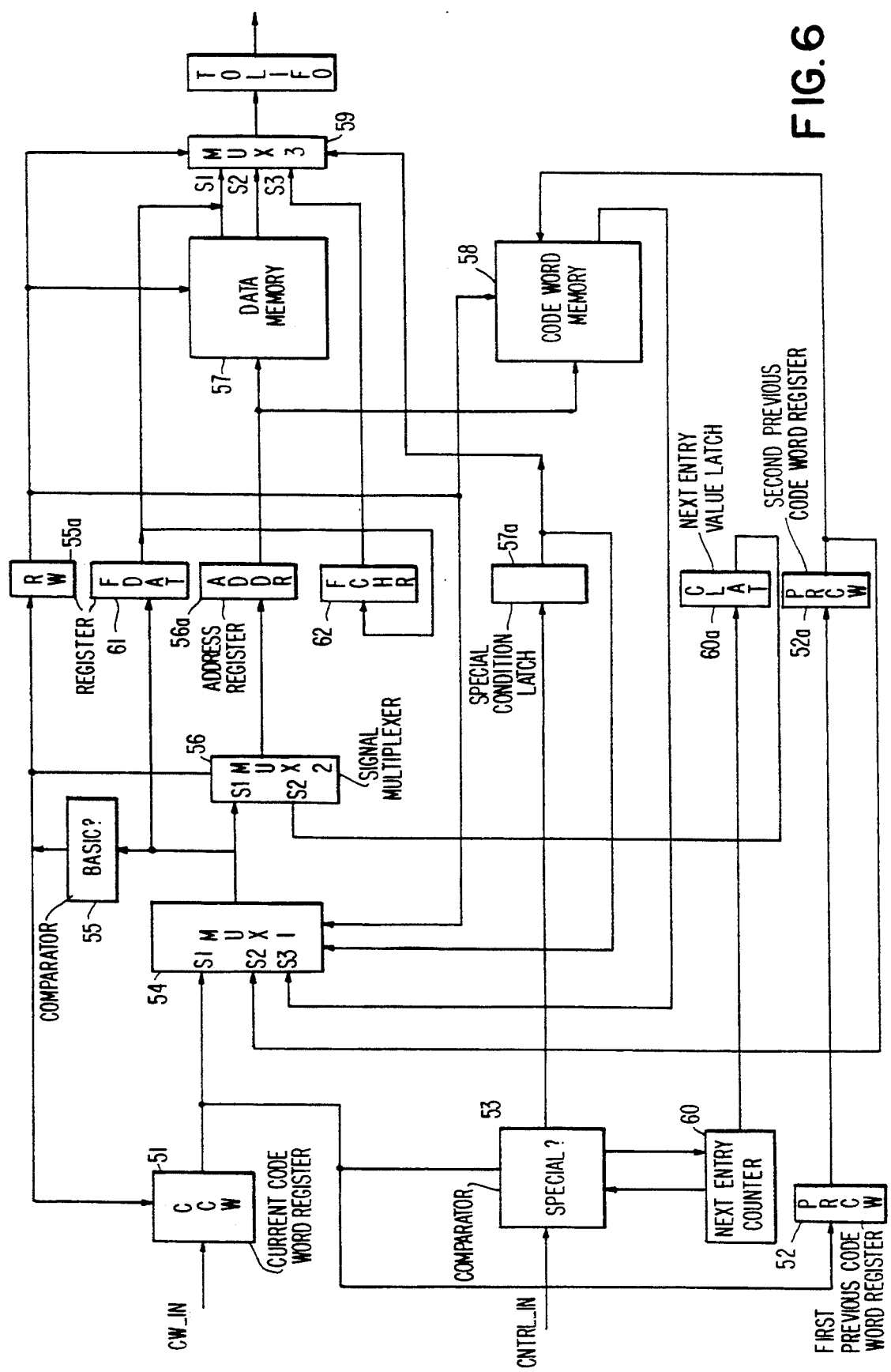
FIG. 6 illustrates a decoder used in the compressor-decompressor shown in FIG. 4.

The decoder circuit of the CODEC 12 is shown in FIG. 6. Current code word register 51 receives a code word from the repacker 14. The register 51 receives a code word after a previous code word has been decoded so that the code word stored in the register 51 is the current code word to be decoded. The code word stored in the register 51 is also stored in the register 52 for use as the previous code word after the register 51 receives a new code word. Finally, the current code word is tested by the circuit 53 to determine whether it is "Special" as described later.

The multiplexer 54 applies the current code word to the comparator 55 which checks whether the code word belongs to the "Basic" set or is a "Special" case. If the code word is not Basic and not Special the multiplexer 56 passes it to address register 56a to be used as an address for retrieving the data-code word entry at that address in the data memory 57 and code word memory 58. The data at that address is transmitted through the multiplexer 59 to the LIFO control logic 138. Similarly, the code word retrieved from that address is used again, and is transmitted through multiplexer 54 to the comparator 55 to determine whether it is Basic. This sequence of steps is repeated until the code word retrieved from the code word memory 58 is Basic.

If the code word is determined to be Basic, the end-of-string condition has been reached. The end-of-string condition occurs when the decoder has completed unraveling the string represented by the current code word. The register 55a provides a one-clock-pulse delay in the control signals consistent with the pipeline operation of the decoder. At this time the decoder is ready to make a new entry in the decoder table at the memory address pointed to by the next-entry counter 60 through the next entry latch 60a and the multiplexer 56. The decoder is also ready to accept a new code word from the current-code-word register 51. In the next cycle of operation the Basic code word is output from the register 61 through the multiplexer 59. At the same time a new entry comprising the previously received code word stored in the register 52, and the first character of the current code word, stored in register 61, is written into the code word memory 58 and data memory 57, respectively. A new code word is also taken from the current code word register 51 at this time.

A code word is considered Special if it is also the next entry to be made in tile decoder table. The new code word is compared by the Special comparator 53 with the count value of the next entry counter 60. If the new code word and the next entry counter value match the code word is Special. The Special condition latch 53a provides a clock delay required by the pipelining of the decoder. Because no entry corresponding to this code word has been made in the decoder tables, the data memory 57 and the code word memory 58 will not be accessed in the following cycle of operation. Instead, the first character of the previous code word, stored in the register 62 is transmitted to the LIFO 10 through the multiplexer 59. To continue the decoding the previously received code word from the register 52 is passed through the second previous code word register 52a which functions as a pipeline delay latch to the multiplexer 54 and used as the address to access the data memory 57 and the code word memory 58.

The scheme for generating the hash function is implemented by a special purpose circuit. Before describing the hash function generating circuit the mathematical functions governing the hash function will be considered.

The design of hash function generators has received considerable attention. The hash function generator must efficiently generate the hash function from the key, and it must perform a pseudo-randomizing function so that all of the keys are not mapped into the same hash address.

For example, a small five-character ASCII field would require $(128)^5$ or over one trillion memory address, if it were to be stored in unique addresses corresponding to its value. The first character of the five character field might be taken as a simple hash function thereby reducing the address field of the hash function to only 128 locations. To retrieve a data item of interest one would address the memory location corresponding to the value of the first character of the key, and then look for the entry with the key that matches all five characters. Obviously, if every key started with the same character, then the desired key and data could be retrieved only by searching the entire address space of the keys.

It should also be noted that in the given example, all keys corresponding to a particular hash function have the same first character. Thus, in such a case the first character of the keys need not be stored, and an abbreviated key can be used instead. In this example the abbreviated key would be the last four letters of the word. Accordingly, it would be desirable to use a hash function generator that is efficient, is pseudo-randomizing and which permits the use of abbreviated keys. This last property imposes the requirement that the hash function and the abbreviated key uniquely represent the input key.

According to the method that is employed, the key k, hash function h and abbreviated key a, are represented in binary form as vectors. The hash function generator H and abbreviated key generator A are matrices of 1's and 0's which satisfy the following equations, $$h = Hk \qquad (1),$$

$$a = Ak \qquad (2).$$

Equations (1) and (2) can be combined in the following manner $$\begin{bmatrix} h \\ \\ a \end{bmatrix} = \begin{bmatrix} H \\ \\ A \end{bmatrix} k, \qquad (3)$$

where $$\begin{bmatrix} h \\ a \end{bmatrix}$$

is a vector, and $$\begin{bmatrix} H \\ A \end{bmatrix}$$

is a matrix. If the matrix $$\begin{bmatrix} H \\ A \end{bmatrix}$$

is invertible, then the following relation holds $$k = \begin{bmatrix} H \\ A \end{bmatrix}^{-1} \begin{bmatrix} h \\ a \end{bmatrix}. \quad (4)$$

Consequently, the combination of the hash function h and the abbreviated key a uniquely represent the original key k. This is an important feature. The uniqueness of the combination of the hash function and the abbreviated key allows for the storage of just the abbreviated key in the second memory with an attendant reduction in memory requirements, and without the loss of the ability to resolve collisions.

The form of the hash function generator H, and the operations required to compute equation (1), are particularly well suited to hardware implementation. This can be seen by expanding equation (1) to show the individual elements of the matrix H and vector k as follows:

$$h = \begin{bmatrix} h11 & h12 & \ldots & h1n \\ h21 & & & . \\ . & & & . \\ . & & & . \\ hm1 & hm2 & & hmn \end{bmatrix} \begin{bmatrix} k1 \\ . \\ . \\ . \\ kn \end{bmatrix} \quad (5)$$

The hash function generator H is an m×n matrix, where hij=0 or 1. The key k is a column vector of n bits, and $k_i$=0 or 1. Carrying out the matrix multiplication yields:

$$h = \begin{bmatrix} h11\ k1 + h12\ k2 + \ldots + h1n\ kn \\ . \\ . \\ h21\ k1 \\ . \\ . \\ hm1\ k1 + hm2\ k2 + \ldots + hmn kn \end{bmatrix} \quad (6)$$

which is an m×1 column vector. Each element of the hash function h is calculated as the sum $$h_i = \Sigma h_{ij} k_j, \ j = 1 \ldots n \quad (7)$$

where the multiplications are binary multiplications, or logical AND, and the summation is binary addition without carry, or modulo-two addition. Thus, the products $h_{ij}k_j$=1 or 0 depending upon whether $h_{ij}$ is 1 or 0, and signals corresponding to the products $h_{ij}k_j$ can be obtained by simply transmitting or not transmitting the bit $k_j$ depending upon whether $h_{ij}$ is 1 or zero. The ith bit, $h_i$, of the hash function h is then equal to the modulo-two sum of the transmitted $k_j$ values for that particular value of i.

For example, assume the following hash function generator:

$$H = \begin{vmatrix} 1 & 0 & 1 & 0 & 0 & 1 \\ 0 & 1 & 1 & 0 & 1 & 0 \\ 1 & 0 & 0 & 0 & 1 & 1 \end{vmatrix}$$

which is a (3×6) matrix for generating a three-bit hash function from a six-bit key.

Figure 7:
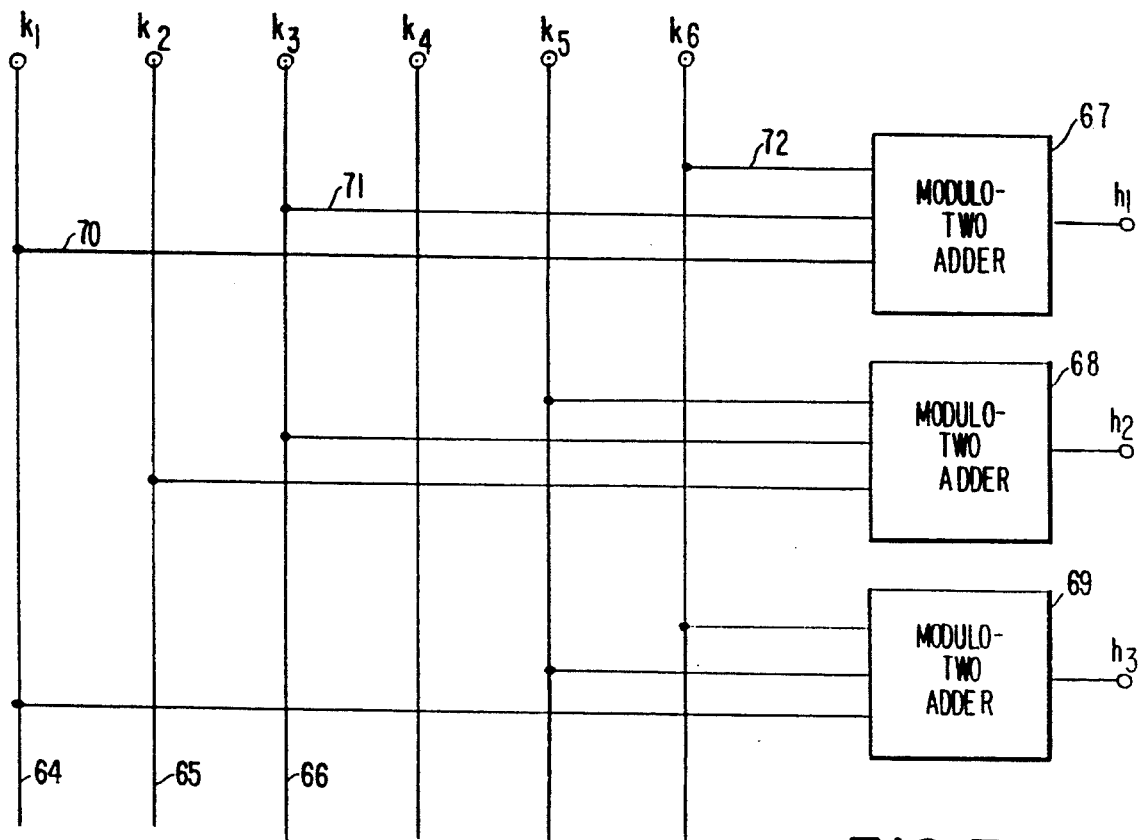
FIG. 7 is a schematic of the hash circuit shown in FIG. 4.

A hashing circuit which implements this generator and carries out hashing using it is shown in FIG. 7. The hashing circuit is comprised of n signal lines each corresponding to a column of the hash function generator H. The key k is represented by binary signals k1 through k6, and each is applied to a corresponding one of the signal lines 64, 65, 66 etc. The modulo-two adders 67, 68 and 69 with their input connections each correspond to a row of the hash function generator H, and each develops a binary output signal corresponding to one of the three bits of the hash function h.

The connections between the signal lines 64 etc. and the inputs of the modulo-two adders 67–69 correspond to the non-zero elements of the hash function generator H. For example, modulo-two adder 67 corresponds to the first row of the matrix H, which has 1 in the first, third and sixth columns. Signal line 70 connects the signal line for $k_1$ to the modulo-two adder 67, and similarly signal line 71 connects the signal line for $k_3$ and signal line 72 connects the signal line for $k_6$ to it. The output of adder 67 is then $(k_1+k_3+k_6)$ (mod 2)=$h_1$.

Similarly, the modulo-two adders 68 and 69 develop binary output signals corresponding to the bits $h_2$ and $h_3$ of the hash function h. In the case where an abbreviated key is to be generated, additional modulo-two adders are provided for the respective bits of the abbreviated key.

Figure 8:
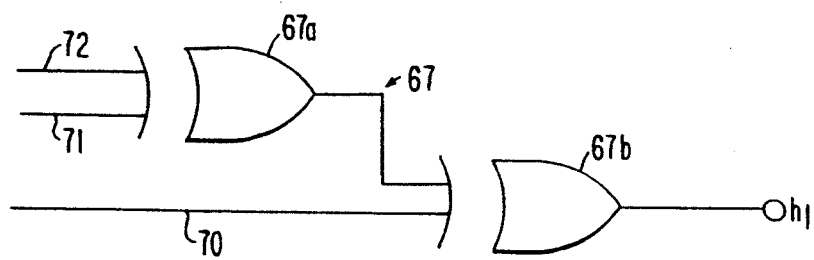
FIG. 8 is a schematic of one of the modulo-two adders shown in FIG. 7.

The modulo-two adders can be constructed by connecting Exclusive-OR gates 67a and 67b in the manner shown in FIG. 8. This circuit is also known as a parity checker and can be readily expanded by adding more Exclusive-OR gates in order to accommodate more than three inputs.

An advantage of the disclosed hashing circuit is that hashing can be carried out at the system clock speed. Unlike other hashing techniques which use other types of hash function generators, the matrix multiplication of equation (1) is carried out in a single step with the simultaneous occurrence of the multiplications and additions comprising the matrix multiplication. Thus, the circuit can be readily used for carrying out hashing in real time.

Figure 9:
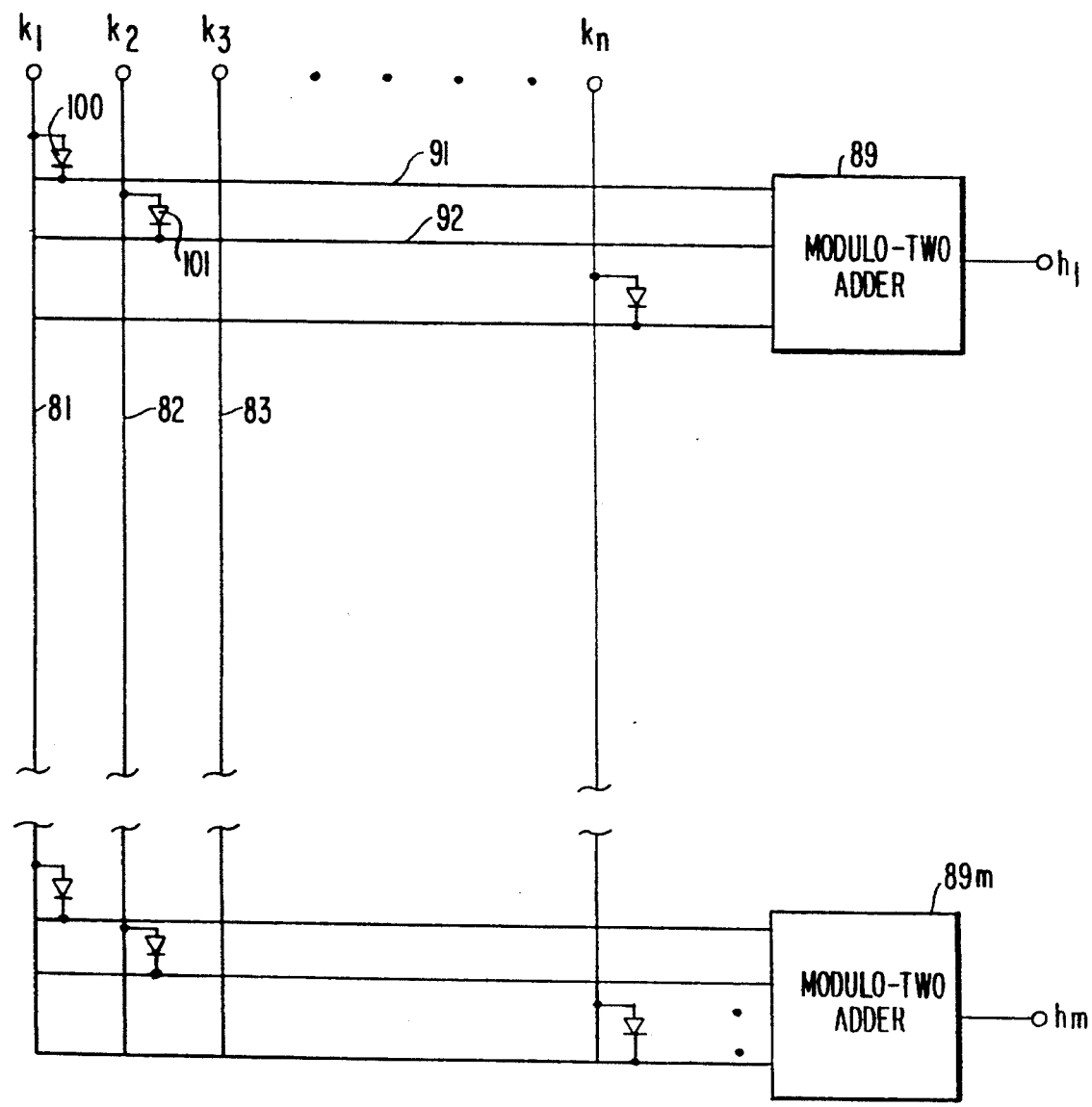
FIGS. 9 and 10 are schematics of other embodiments of hash circuits.

Another advantage of the hashing circuit is that it can be made programmable, and a particular hash function generator H can be selected after the circuit has been fabricated. A programmable embodiment of the hashing circuit is shown in FIG. 9. This circuit comprises n input signal lines 81, 82, 83, etc. each for receiving a corresponding one of the binary signals $k_1$ through $k_n$ corresponding to the bits of the key. There are m modulo-two counters, the first of which are labeled 89 and 89m. The output of each modulo-two counter is a binary signal corresponding to one bit of the hash function h.

Each modulo-two counter has n inputs, and n circuit paths 91, 92, etc, are connected to the respective inputs. The signal lines 81, 82 . . . and the circuit paths 91, 92 . . . cross in an array to permit interconnections between the two. The interconnections between the signal lines and the circuit paths are made by diodes 100, 101, etc. Each diode is connected between a respective one of the signal lines and a respective one of the circuit paths. For example; diode 100 connects signal path 81 and circuit path 91; diode 101 connects signal path 82 and circuit path 92, etc. The diodes are fusible in order to open the connection which they establish. Upon the application of a sufficiently high voltage to a selected one of the diodes, the selected diode fails and an open circuit exists between the signal line and the circuit path between which it was connected. The use of fusible diodes to open predefined circuit links and thereby render a circuit programmable is known from programmable logic device technology and can be done in the manner known in that technology.

For simplicity, not all of the signal lines, circuit paths or diodes are shown. As the programmable hash circuit has been described, however, there are n circuit paths for each of the m modulo-two adders, and a diode for connecting each of the signal lines to a corresponding circuit path. This structure is programmable to realize any m-bit hash function, but the modulo-two adders are consequently of the maximum size.

Figure 10:
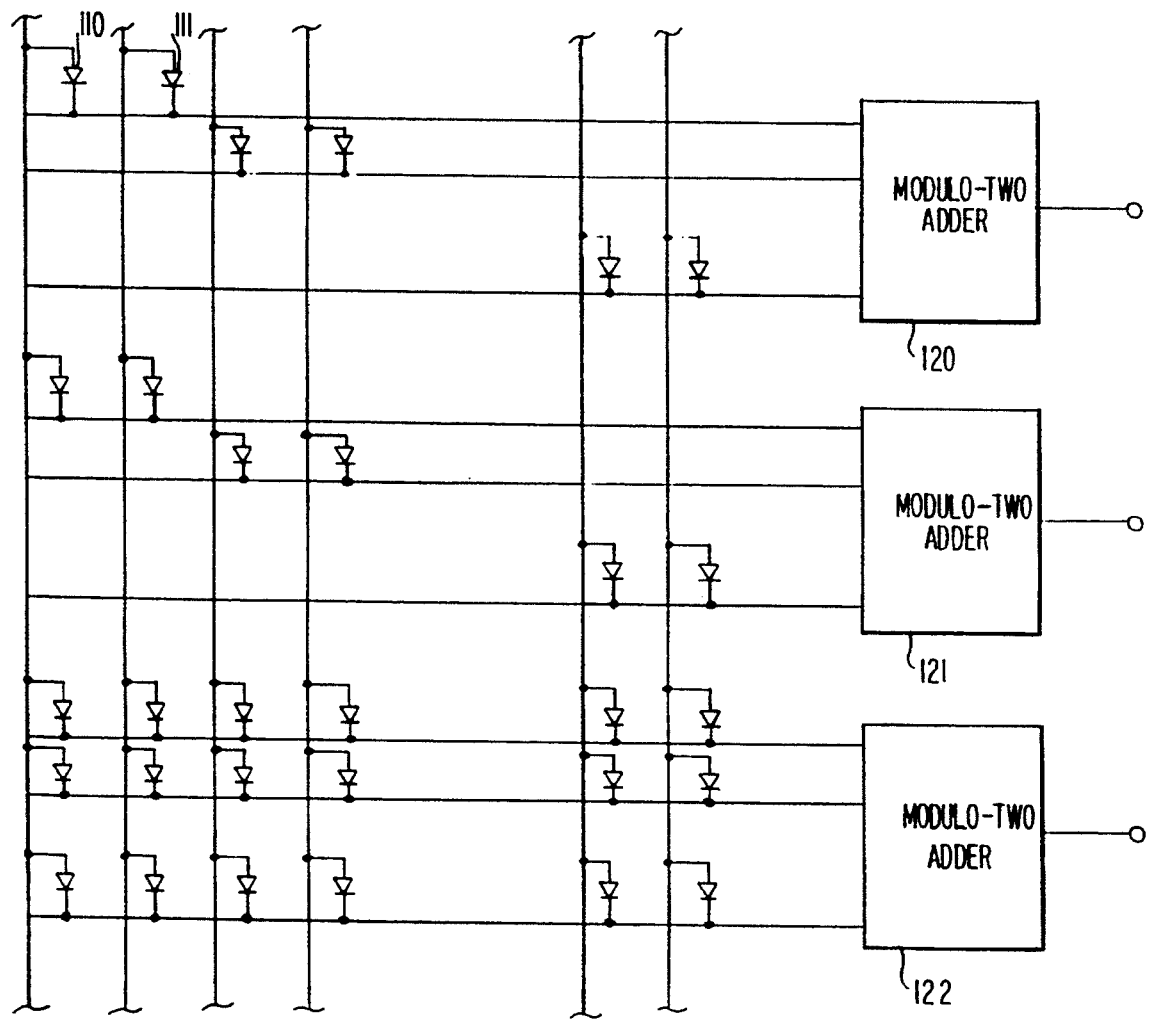

In another embodiment of the invention the modulo-two adders have fewer inputs than the number of signal lines, and at some of the circuit paths is connected to more than one signal line. Such an embodiment is shown in FIG. 10 in which the modulo-two adders 120, 121 and 122 have fewer than n inputs. In this particular embodiment, the modulo-two adders 120 and 121 have an equal number of inputs and the modulo-two adder 122 has a fewer number of inputs. Different schemes for allocating diode connections between the signal lines and the circuit paths can be used. The modulo-two adders 120 and 121 have a sufficient number of diodes 110, 111 etc. so that each signal line is connected to at least one circuit path. In contrast, every signal line is connected to every circuit path for the modulo-two adder 122 so as to achieve the maximum degree of programmability.

The matrix which is a composite of the hash function generator H and the abbreviated key generator A can be derived in a straightforward manner. Starting with the identity matrix pairs of bit rows or columns can be selected at random, added modulo-two, and the sum substituted for the first selected row or column, or simply exchanged. These linear operations applied to an invertible matrix preserves the invertibility property. Consequently, it provides a way to generate a randomized invertible matrix. These steps must be repeated any number of times, and the first m rows of the resulting matrix is H and the remaining (n-m) rows is A.

Figure 11:
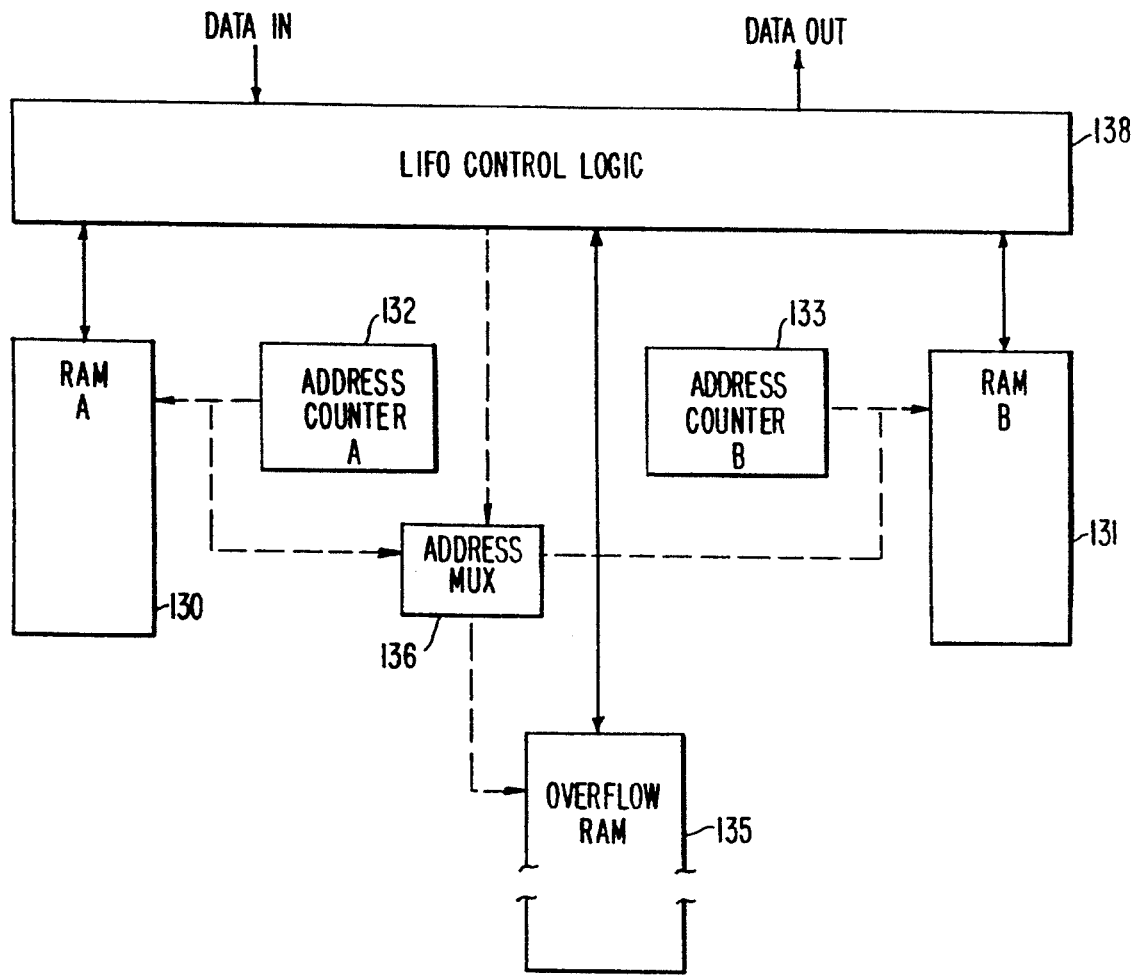
FIG. 11 illustrates a last-in first-out buffer comprising part of the control of the encoder shown in FIG. 5.

To reverse the order of characters in the string sequence as the LZ decoding algorithm requires, the data decoder applies its output to a last-in first-out buffer (LIFO), which is illustrated in FIG. 11. The LIFO is comprised of two random access memories (RAM) 130 and 131, controlled by LIFO control logic 138, through which input data from CODEC 12 and output data pass. A first character string is read into the memory 130. The character order is preserved by the address counter 132 which develops a sequence of address values for storing the characters of the input string in sequence.

Diminishment of the system performance by LIFO operation is avoided by the provision of a second RAM 131 which can also be addressed during addressing of the RAM 130. Character strings are stored in order in the RAM 131 under control of its corresponding address counter 133.

To prevent loss of data an overflow memory 135 is provided to receive and store data when the respective RAM 130 or 131 being written into is full. For example, if an input string is written into RAM 130 and its capacity is reached, the input string is then written into the overflow memory 135. The order of the string is preserved by using the address counter 132 for both the RAM 130 and the overflow RAM 135. When the RAM 130 becomes full additional data is passed to the overflow RAM 135 and the address counter 132 continues the sequential count of address values associated with the string being read in. The address values are applied through the address multiplexer 136 so that correspondence between the string characters and the count value is preserved even though the string is stored in two physically separate memories.

When the string data is read out the address counter 132 counts backward from the last memory value address during the writing of the string into the overflow RAM 135. In this way the stored string is read out in reverse order.

During the reading out of the string stored in the overflow RAM 135 and RAM 130, another string is written into the RAM 131 and stored at successive memory locations having addresses determined by the address counter 133. The feature of separate means for developing address values for the respective memories 130, 131 enables them to be operated separately so that one can write in data while data is read out from the other. In this way equal length strings can be reversed without slowing the processing speed of the system in which the LIFO buffer is used.

From the described mode of operation it is clear that for RAMS 130 and 131 having at least a depth D, the LIFO buffer can continuously buffer strings of length 2D without any loss of speed. This result follows from the fact that a stored string of length 2D filling one RAM, for example RAM 130, and the overflow RAM 135 is read out first from the overflow RAM 135 in order to reverse the string. During this reading out the simultaneous writing and storage of a subsequent string will start with the RAM 131. The RAM 131 of depth D will not be completely filled until the overflow RAM 135, which stored a string segment of length D, is empty thus freeing the overflow RAM 135 to store the remaining segment of length D of the string being written.

In order to handle strings of length greater than 2D the overflow RAM 135 must have a depth greater than D. Strings longer than 2D will degrade the performance of the LIFO buffer. The degree of performance degradation is equal to the sum of the long string length and the short string length divided by twice the long string length. In the worst case the LIFO buffer speed approaches one-half the maximum speed.

Figure 12:
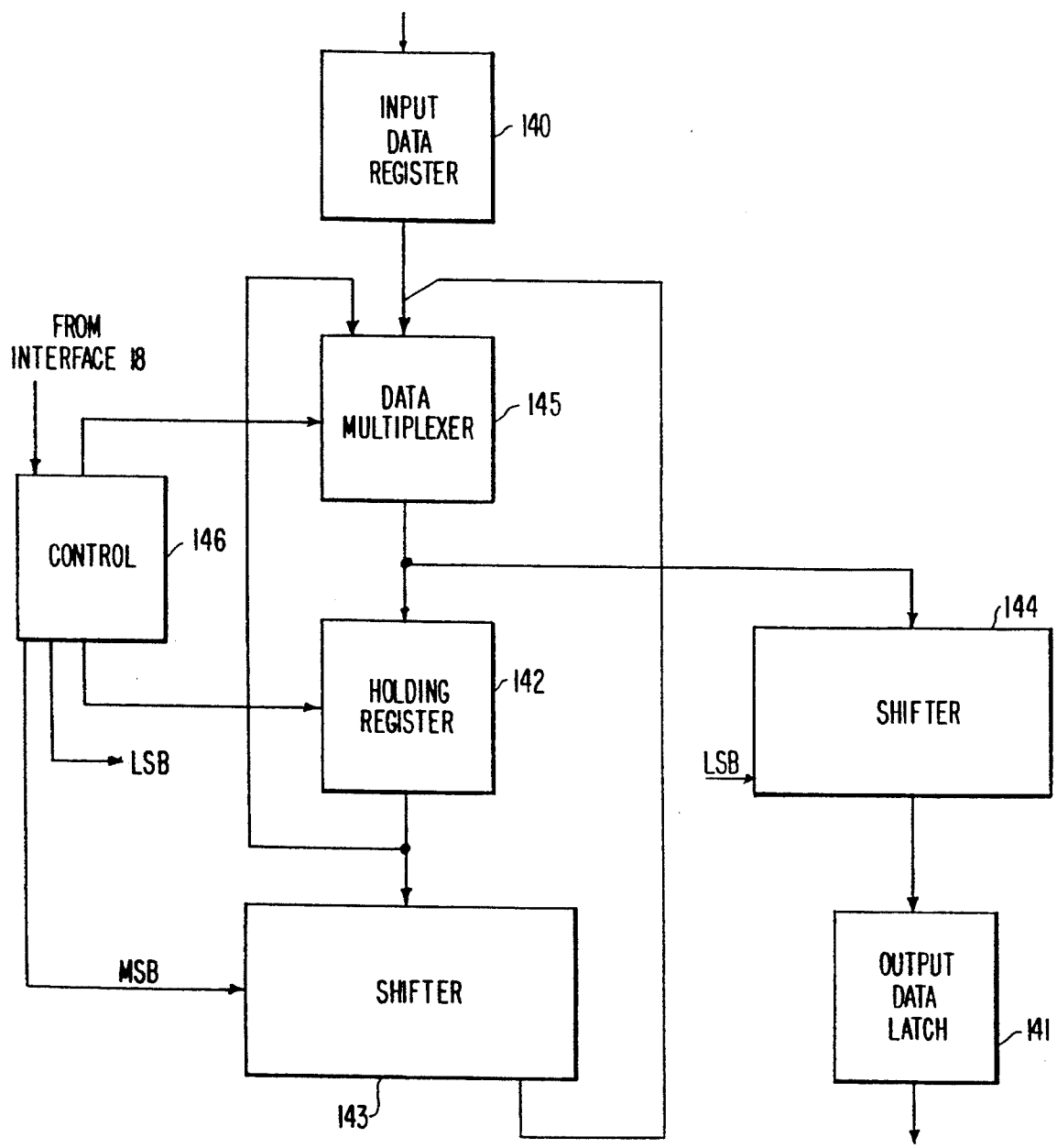
FIG. 12 is a block diagram of a data repacker 14 shown in FIG. 4.

The data repacker 14 circuit is shown in FIG. 12. It is comprised of an input data register 140 and an output data latch 141, both of which help improve system performance. Neither the register 140 or the latch 141 are used in the actual data repacking function, however.

The holding register 142 is used to store intermediate results and has a storage length twice the size of the data words being repacked. Shifter 143 and shifter 144 also have a storage length twice the size of the data words and select a number of bits equal to the data word length, e.g. sixteen of thirty-two bits. The multiplexer 145 is a 2:1 multiplexer. One input of the multiplexer 145 is connected to the output of the holding register 142, to maintain the contents of register 142 until the amount of valid data remaining leaves room for concatenation of new data latched in register 140. When directed by the control circuit 146, the other input receives concatenated input data and data from shifter 143.

In operation, the control circuit 146 receives signals from the microprocessor/memory interface 18 which represent the number of bits in (NBI) and the number of bits out (NBO). From this information it determines a most significant bit (MSB) and a least significant bit (LSB) of the intermediate data which will be stored in the holding register 142.

When data is passed to the input of the repacker it is latched by the input data register 140, and on the next clock cycle it is combined with the intermediate data in the holding register 142, if there is room. There will be room if there are fewer valid intermediate data bits in the holding register 142 than the number of bits in a data word. The number of valid data bits equals MSB minus LSB. If there is sufficient room the input data becomes the high bits of the holding register, and the shifted data from the holding register becomes the low bits of the holding register. If there is insufficient room in the holding register 142 the input data is not combined with the intermediate data. The shifter 144 receives a signal indicating the LSB and shifts its content to the right-justify the intermediate data for presentation at the output.

What is claimed:

1. A method of pipe-lined memory accessing for a multiplicity of sequentially received data values forming a string, comprising:
   receiving said sequentially received data values,
   storing pointer values in a first memory,
   storing data values and respective further pointer values in a second memory at locations corresponding to pointer values in said first memory,
   hashing respective prefix-data combinations formed from a respective prefix and a respective one of said data values to provide a respective hash value, said respective hash value including an address in said first memory,
   responsive to hashing of a given prefix-data combination including a given received data value, and the resulting hash value corresponding to one location in said first memory at which a pointer value is already stored, hashing the next received data value with an assumed prefix having a value corresponding to that already stored pointer value; comparing the data value stored at the location corresponding to said pointer value stored at said one location in said second memory with a value related to said given received data value, while hashing said assumed prefix with said next received data value; and selecting the prefix for the next hashing responsive to the result of the comparison, and
   responsive to hashing of said given prefix-data combination including said given received data value, and the resulting hash value corresponding to a location in said first memory at which a pointer value is not already stored, hashing the next received data value with a prefix having a value corresponding to said given received data value.

2. A method as claimed in claim 1, characterized by storing, at each location in said first memory, a respective tag bit whose value indicates whether or not a respective said pointer value is stored at that location.

3. A method as claimed in claim 1, characterized by storing, at each location in said second memory, a respective tag bit whose value indicates whether or not a respective said data value is stored at that location.

4. A method as claimed in claim 1, characterized in that said hashing produces hash values which respectively comprise an address portion and an abbreviated key, said address portion and abbreviated key together being invertible, said data values stored in said second memory comprise said abbreviated keys, and comparing includes comparing the respective abbreviated key stored in the second memory with the abbreviated key portion of the hashed value of the corresponding received data value.

5. An apparatus for pipe-lined memory accessing for a multiplicity of sequentially received data values forming a string, comprising:

means for receiving said sequentially received data values, a first memory for storing pointer values, a second memory for storing data values and respective further pointer values at locations corresponding to pointer values in said first memory, comparing means for comparing the data value stored in a given location in said second memory with a value related to one of said received data values, means for selecting a prefix, and hashing means, coupled to the means for receiving and said means for selecting, for hashing respective prefix-data combinations formed from a respective prefix and a respective one of said data values to provide a respective hash value, said respective hash value including an address in said first memory, said means for selecting, responsive to hashing of a given prefix-data combination including a given received data value, and the resulting hash value corresponding to one location in said first memory at which a pointer value is already stored, providing a value corresponding to that already stored pointer value to said hashing means, to be an assumed prefix for hashing with the next received data value after said given received data value; said comparing means, while said hashing means is then hashing said assumed prefix with said next received data value, comparing the data value stored at the location corresponding to said pointer value stored at said one location in said second memory with a value related to said given received data value; and said means for selecting being responsive to the result of the comparison in selecting the prefix for the next hashing, and said means for selecting, responsive to hashing of said given prefix-data combination including said given received data value, and the resulting hash value corresponding to a location in said first memory at which a pointer value is not already stored, providing said given received data value to said hashing means to be the prefix for hashing with the next received data value after said given received data value.

6. An apparatus as claimed in claim 5, characterized in that said first memory comprises, at each location, a respective tag bit whose value indicates whether or not a respective said pointer value is stored at that location.

7. An apparatus as claimed in claim 5, characterized in that said second memory comprises, at each location, a respective tag bit whose value indicates whether or not a respective said data value is stored at that location.

8. An apparatus as claimed in claim 5, characterized in that said hashing means produces hash values which respectively comprise an address portion and an abbreviated key, said address portion and abbreviated key together being invertible, said data values stored in said second memory comprise said abbreviated keys, and said means for comparing compares the respective abbreviated key stored in said given location with the abbreviated key portion of the hashed value of said one of said received data values.

* * * * *